Feb. 15, 1944.   F. W. SCHILLBERG   2,341,660
TOOL AND HOLDER THEREFOR
Filed Oct. 6, 1942

INVENTOR
Frank W. Schillberg,
BY
James C. Bethell
ATTORNEY

Patented Feb. 15, 1944

2,341,660

UNITED STATES PATENT OFFICE 2,341,660

TOOL AND HOLDER THEREFOR

Frank W. Schillberg, Bridgeport, Conn., assignor to Auto-Ordnance Corporation, Bridgeport, Conn., a corporation of New York Application October 6, 1942, Serial No. 460,931

3 Claims. (Cl. 29—102)

This invention relates to tools and to holders therefor for various types of machine, such as lathes, etc., and has for one of its objects the provision of a construction which is new and novel and in operation superior to such devices as now constructed.

A further object of my invention is the provision of a construction in which the work may be machined faster than heretofore possible and in which the finished work is smooth and free of cutter marks.

While certain features of my invention, as above mentioned, are adaptable for use in connection with tools of various kinds, I have elected to illustrate my invention as applied to forming-tools and forming-tool holders.

Figure 1:
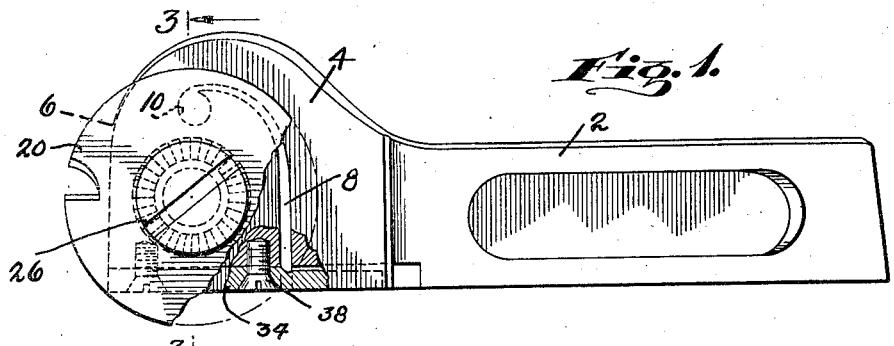
Fig. 1 is a side elevational view of a tool and holder therefor embodying my invention.
Figure 2:
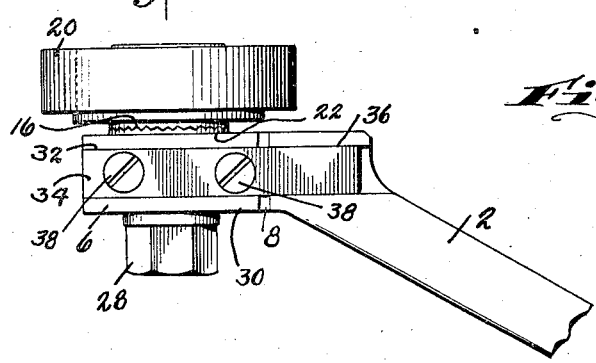
Fig. 2 is a bottom plan view.
Figure 3:
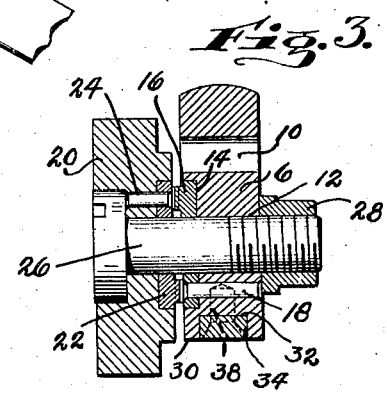
Fig. 3 is a section on the line 3—3 of Fig. 1.
Figure 4:
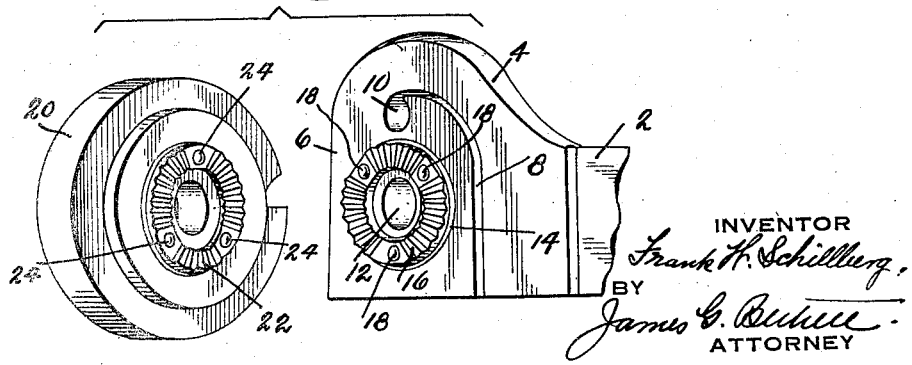
Fig. 4 is a view of a forming-tool removed from the holder and the head of the holder.

Referring to the drawing in detail: 2 designates a tool holder shank, which, it will be appreciated, is adapted to be clamped in the usual way in the tool post of a machine.

As will be apparent from the drawing, the forward end of the shank 2 is in the form of a gooseneck 4 integral with the tool holder shank and with the tool holder head 6, the latter underlying the gooseneck.

The shank 2 and head 6 are separated from each other by a gap 8, extending from the lower edge of the holder to a point in the upper part of the head 6 where the gap terminates in a terminal enlargement 10.

12 designates a hole passing transversely through the holder head 6, below the terminal enlargement 10. The centers of hole 12 and terminal enlargement 10 are shown in vertical alignment.

The head 6 in one face is recessed at the orifice or hole 12, as shown at 14, this recess being concentric with the orifice.

Mounted in the recess 14 is a ratchet plate 16 which is removably held in the holder head by pins 18.

20 designates the tool which is to be held in the holder. In the drawing this is shown as a forming-tool, although this is merely for illustrative purposes, inasmuch as other tools may be used with the holder, as above pointed out. Mounted in a recess in the inner face of this tool 20 is a ratchet plate 22 which cooperates with the ratchet plate 16. The plate 22 is removably mounted in the tool, being held therein by pins 24.

26 designates a clamping bolt which passes through the tool 20 and through the orifice 12. By tightening the nut 28 with which this bolt is provided the tool is held to the head 6 of the holder with the teeth of ratchet plates 16 and 22 in interengagement, which effectively prevents turning of the tool on the head even under the heaviest cuts and without the necessity of tightening the nut 28 with any tremendous pressure.

As pointed out above, the shank 2 and head 6 of the tool holder are separated by a gap 8. This construction imparts a certain amount of resiliency to the holder, whereby the tool 20 can yield slightly if a tough spot or area is encountered in the work-piece, this construction eliminating chattering of the tool and tearing of the work. The shape of the gap 8 along with the shape of the upper surface of the gooseneck 4 constitute the subject matter of another application of mine and hence will not be further detailed herein. However, in this connection, in the holder of the instant application I provide a further advantageous feature in that the bottom edge 30 of the holder head 6 is grooved lengthwise of the tool holder, as shown at 32, for the reception of a key 34 which is rigidly mounted in this groove or keyway. The groove is continued into the bottom edge of the tool holder shank, as shown at 36, and the key 34 extends across the gap 8 into this groove or keyway. The key 34 is secured to the tool holder head by screws 38, for example, but is not secured to the tool holder shank. In this connection, it should be noted that the key does not bottom in the groove 36, as illustrated in Fig. 1, so that while sidesway of the head relatively to the body of the tool holder is prevented because the key, laterally of the holder, fits the groove 36, the resiliency of the tool holder head is not impaired, due to the space provided between the tail of the key and keyway or groove 36.

From all of the foregoing it will be evident to the man skilled in this art that I have provided a construction which while extremely simple possesses many advantages over similar devices as heretofore constructed. Not only is the holder so constructed that the tool is adapted to yield when taking extremely heavy cuts, or when encountering a tough spot in the work-piece, but means have been provided for preventing sidesway at the same time. This permits faster and smoother cuts than heretofore found commercially practicable, and eliminates tool chatter and cutter marks on the machined part.

In addition to these features I wish to emphasize the importance of the ratchets 16 and 22. By removably mounting these members in the tool holder and tool, not only is it a simple matter to replace them, should they be ruptured in use, but they may be made of suitable material, not necessarily of the same material as the tool or holder, with proper regard for the duty they are to perform so that breakage will be reduced to the minimum.

It is to be understood that while I have described one embodiment of my invention, the details of construction and arrangement of parts herein illustrated and described may be departed from within the purview of my invention.

What I claim is:

1. In combination a tool holder comprising a shank and an integral head, a ratchet plate rigidly secured to the side of the head of the tool holder, a tool to be clamped to said head, a ratchet plate removably mounted in said tool, a bolt passing through the tool and head and said ratchet plates, and a nut on said bolt for drawing the tool to the head of the tool holder to bring the teeth of said ratchet plates into interengagement whereby the tool will be clamped to the holder and positively prevented from rotating relatively thereto.

2. In combination a tool holder comprising a shank and an integral head, a ratchet plate removably inserted in the side of the tool holder head and held against turning relatively thereto, a tool to be clamped to said head, a ratchet plate removably mounted in the side of the tool and held against turning relatively thereto, a bolt passing through the tool and tool holder head, and a nut on said bolt for drawing the tool to the head to interengage the ratchet plate teeth thereby to clamp the tool to the holder and positively prevent relative rotation of tool and holder.

3. In combination a tool holder comprising a shank and integral head, a ratchet plate removably inserted in said head, a tool to be clamped to said head, a ratchet plate removably mounted in said tool, a bolt adapted to pass through the tool and head and said ratchet plates, and a nut on the bolt for drawing the tool to the head to bring the teeth of said ratchet plates into interengagement whereby the tool will be clamped to the holder and positively prevented from rotating relatively thereto.

FRANK W. SCHILLBERG.